(12) United States Patent
Ludwig et al.

(10) Patent No.: US 6,622,523 B2
(45) Date of Patent: Sep. 23, 2003

(54) METHOD OF CONVERTING HALOGENATED COMPOUNDS TO GLASS

(76) Inventors: Christopher J. Ludwig, 5308 Maple La., Colleyville, TX (US) 76034; Frederic M. Schwartz, 1006 Richard La., Danville, CA (US) 94526

( * ) Notice: Subject to any disclaimer, the term of this patent is extended or adjusted under 35 U.S.C. 154(b) by 212 days.

(21) Appl. No.: 09/812,459

(22) Filed: Mar. 20, 2001

(65) Prior Publication Data

US 2001/0045106 A1 Nov. 29, 2001

Related U.S. Application Data

(60) Provisional application No. 60/190,786, filed on Mar. 21, 2000.

(51) Int. Cl.$^7$ .............................. C03B 19/06; C03B 5/16
(52) U.S. Cl. ..................... 65/17.4; 65/134.8; 588/201; 588/206; 588/212; 588/248; 423/158; 423/163; 423/178; 423/331; 423/336; 423/337; 423/341
(58) Field of Search ............................... 65/17.4, 134.8; 423/158, 163, 178, 331, 336, 337, 341; 588/201, 206, 212, 248

(56) References Cited

U.S. PATENT DOCUMENTS

| | | | |
|---|---|---|---|
| 5,354,355 A | 10/1994 | Chapman | 75/414 |
| 5,416,247 A | 5/1995 | Webster | 588/206 |
| 5,434,333 A | 7/1995 | Jantzen et al. | 588/3 |
| 5,443,618 A | 8/1995 | Chapman | 75/414 |
| 5,476,991 A | 12/1995 | Schnittgrund et al. | 588/201 |
| 5,613,241 A | 3/1997 | Forsberg et al. | 588/11 |
| 5,637,127 A | 6/1997 | McLaughlin et al. | 65/134.8 |
| 5,648,592 A | 7/1997 | Pierce | 588/227 |
| 5,678,244 A | 10/1997 | Shaw et al. | 588/201 |
| 5,709,734 A | 1/1998 | Scholz et al. | 95/131 |
| 5,848,960 A | 12/1998 | Mechtersheimer et al. | 588/252 |
| 5,891,011 A | 4/1999 | Wicks | 588/252 |
| 5,936,137 A | 8/1999 | Zachariah et al. | 588/206 |

Primary Examiner—Michael Colaianni
(74) Attorney, Agent, or Firm—Charles D. Gunter, Jr.

(57) ABSTRACT

The present invention provides a two stage process of thermal separation of CFCs and HCFCs followed by vitrification of the waste into a commercially viable glass. In the first stage, the hydrogenated compounds are reacted at elevated temperature with water and a metal oxide such as calcium oxide to form a halide salt and carbon dioxide. In the second stage of the process, the brine slag is reacted at elevated temperature with the carbon dioxide from stage one and glass-forming raw materials such as silicon dioxide to produce a glass. The final glass product incorporates the halide into the glass.

20 Claims, 2 Drawing Sheets

METHOD OF CONVERTING HALOGENATED COMPOUNDS TO GLASS

This Appln claims benefit of Prov. No. 60/190,786 filed Mar. 21, 2000.

BACKGROUND OF THE INVENTION

1. Field of the Invention

The present invention relates in general to methods of disposing of halogenated hydrocarbons. More specifically, the present invention relates to the formation of a commercially viable glass that incorporates halogenated refrigerants such into the glass.

2. Description of the Prior Art

The need for devices to effectively treat and dispose of waste materials without creating undue environmental contamination has been recognized for many years. Incinerators and vitrification devices have been used to reduce municipal solid wastes to ash which must then be disposed of by conventional means, such as burial in a landfill. Incinerators have also been either used for, or proposed for, the disposal of other forms of commonly occurring waste products; in particularly, halogenated organic compounds. The resultant product from the incineration is typically a halide free ash. Vitrification is used to encapsulate the incinerator ash. When halogens are contained within such waste material, the halogens create unique problems, which are not adequately addressed by conventional treatment methods. In particular, a method of treating refrigerant hydrocarbons such as chlorofluorocarbons (CFCs) or hydrogenated chlorofluorocarbons (HCFCs) is needed.

There have been several methods of disposing of hydrogenated compounds and CFC refrigerants. Webster in U.S. Pat. No. 5,416,247 discloses a method of disposing of halogenated hydrocarbons whereby the compounds are reacted with an oxide or carbonate of an alkaline earth metal at elevated temperature, thus creating a halide salt that can be placed in a landfill. Scholz et al. in U.S. Pat. No. 5,709,734 reacts the CFC or other halogenated compound with a solid sorbent material such as iron oxyhydroxide at elevated temperatures, the halogen thereby reacting with the solid sorbent and being disposed of. Zachariah et al. in U.S. Pat. No. 5,936,137 discloses a method whereby the vapor of an alkali metal is reacted with the halocarbon gas directly, thus leading to millisecond time-scale reactions. The vapor metal halide product is condensed and then disposed of.

The incineration of wastes has also been used to encapsulate wastes into a glass which immobilizes the wastes for safe landfill disposal. The devices described by Chapman in U.S. Pat. Nos. 5,443,618 and 5,354,355 are such devices, wherein feed material is converted to a glassified material. A method of disposing of halogenated compounds by forming a glass is described by Shaw et al. in U.S. Pat. No. 5,678,244, wherein a molten bath is created having a molten phase and a vitreous phase, the vitreous phase having calcium, silicon and aluminum oxides. The halogenated compound is directed to the molten phase wherein the halogen dissociates from the compound and reacts with the vitreous phase. The Shaw et al method then takes the inorganic halogen compound which is formed and draws it away from the molten material and disposed of.

Plasma vitrification of waste materials is described by McLaughlin et al. in U.S. Pat. No. 5,637,127, wherein hazardous wastes are directed into a plasma of between 2000° C. and 10,000° C. in the presence of glass-forming materials such as silicon dioxide and boron oxide to form a glass. Forsberg et al. in U.S. Pat. No. 5,613,241 describes yet another method of waste disposal using incineration and/or vitrification. This process provides a bath of molten glass containing a sacrificial metal oxide such as lead oxide or bismuth oxide capable of reacting with the halogen in the waste material. Once reacted, a metal salt is formed which becomes a gas at the temperatures of the molten glass. This gas is then drawn off, reacted with aqueous metal hydroxides, and ultimately converted to a harmless salt. In this process, the halogen, such as chlorine or fluorine, is not incorporated into the final glass material. The glass material is then disposed of. In this process, a glass is made of such materials such as lead borate, bismuth borate, borosilicate glasses, silica glasses, glass ceramics, and polymeric aluminum phosphate glasses.

There are several problems with prior art methods of treating halogenated compounds by incineration and/or vitrification. One major drawback is the use of such compounds as lead oxide in reacting the halide. Lead itself is a harmful environmental contaminate and thus, it is advantageous to avoid its use. Further, the prior art processes leave behind chlorine and fluorine salts. Although these may be harmless, they to must also be disposed of. Since these salts are water soluble, they cannot be simply placed into landfills, etc. Also, the prior art processes leave behind material that must be disposed of, with no commercial value.

Therefore, there is a need for an improved method of disposing of halogenated compounds; and in particular, gaseous and liquid compounds such as CFCs and HCFCs refrigerant.

SUMMARY OF THE INVENTION

It is thus an object of the present invention to provide an improved method of destroying and disposing of environmentally hazardous CFCs and HCFCs.

It is yet another object of the present invention to provide a method of vitrification of waste containing halogenated compounds, the glass resulting from the process being commercially viable and thus avoiding landfilling.

These and other objects are achieved by providing a two stage process of incineration of CFCs and HCFCs followed by vitrification of the waste into a commercially viable glass. In the first stage, the hydrogenated compounds are reacted at elevated temperature with water and a metal oxide such as calcium oxide to form a halide salt and carbon dioxide. In the second stage of the process, the brine slurry is reacted at elevated temperature with the carbon dioxide from stage one and glass-forming raw materials such as silicon dioxide to produce a glass. The final glass product incorporates the halide into the glass.

Additional objects, features and advantages will be apparent in the written description which follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
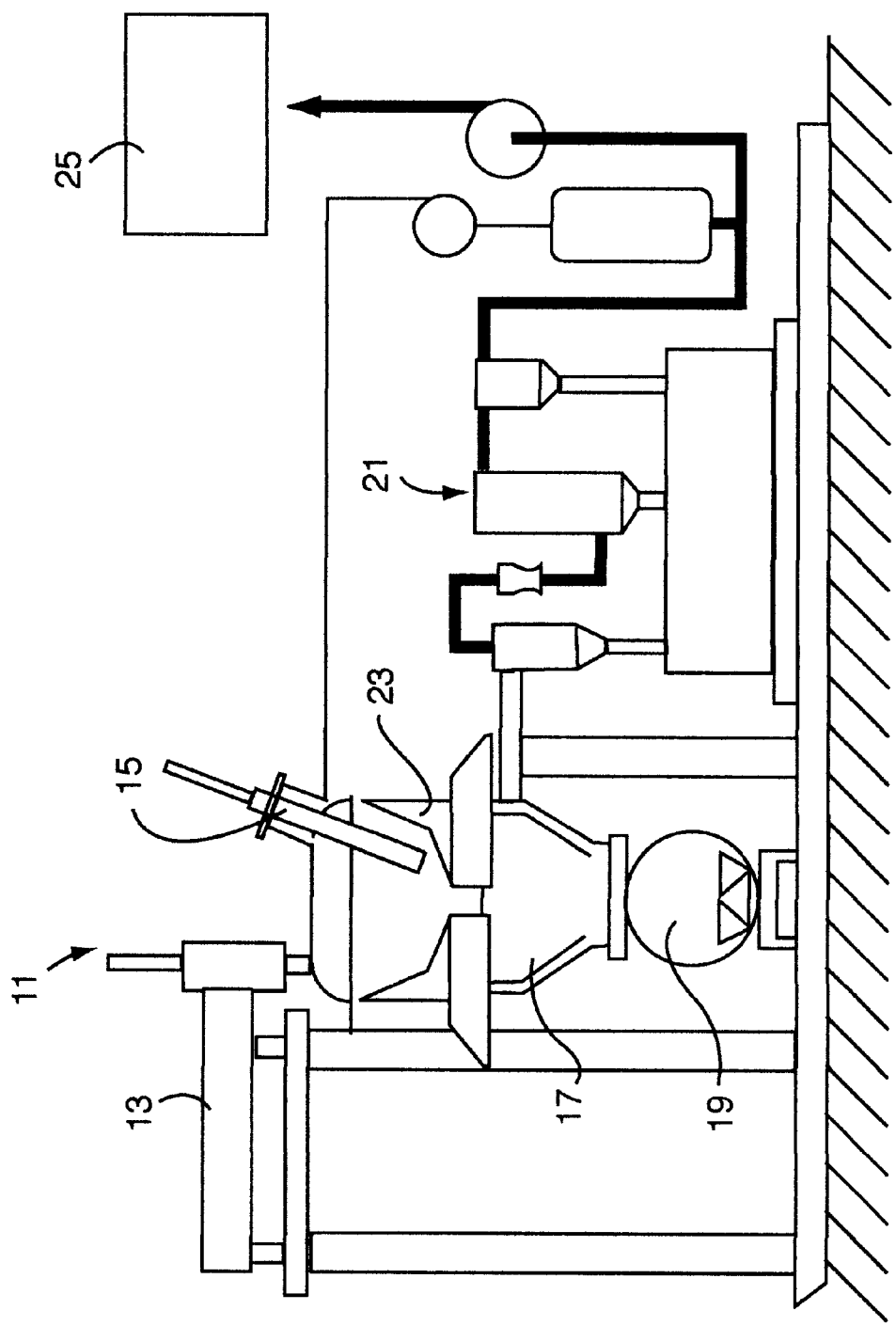
FIG. 1 is a flow diagram of the Stage One incineration device of the invention.

The present invention is a process designed to convert refrigerant hydrocarbons and chlorofluorocarbon (CFC, HCFC) refrigerants to a rough glass frit product for reuse in commerce as a feed stock for halide glass manufacturing. The invention is a two stage processes incorporating the incineration of the gaseous and liquid CFCs and HCFCs in Stage One, followed by vitrification of a brine slurry feed stock from the incinerated reaction product in Stage Two.

The method of the present invention is designed to treat and glassify any type of refrigerant hydrocarbon, CFC or HCFC. The glassified product can be used commercially, thus avoiding the need for landfilling. The present invention is particularly useful for disposing of the following compounds (listed by their common classification as a refrigerant, and the chemical name):

R-11 Trichlorofluoromethane
R-12 Dichlorodifluoromethane
R-13 Chlorodifluoromethane
R-22 Chlorodifluoromethane
R-113 Trichlorotrifluoroethane
R-114 Dichlorotetrafluoroethane
R-115 Chloropentafluoroethane
R-123 Dichlorotrifluoroethane
R-124 Chlorotetrafluoroethane
R-125 Pentafluoroethane
R-134a Tetrafluoroethane
R-141b Dichlorofluoroethane
R-142b Chlorodifluoroethane
R-143a Trifluoroethane
R-500 Dichlorodifluoromethane/difluoroethane
R-502 Chlorodifluoromethane/Chloropentafluoroethane The method of the present invention is also useful in treating the following hydrocarbons, CFC and HCFC compounds:

R-14 Terafluoromethane
R-23 Trifluoromethane
R-116 Hexafluoroethane
R-142b Chlorodifluoroethane
R-152a Difluoroethane
R-12B Bromochlorodifluoromethane
R-13B Bromotrifluoromethane
R-1120 Chlorodifluoroethane
R-110 Chloroethane
R-40 Chloromethane
R-1130 Dichloroethylene
R-32 Dichloromethane
R-40 Chloromethane
R-30 Methylene chloride
R-10 Carbontetrachloride The Stage One process of the present invention is an incineration system such as an argon plasma system operating at temperatures in excess of 3000° F. to separate chlorine and fluorine from carbon. The free chlorine and fluorine, which is typically in the form of radical ions or neutral species, is heated in the presence of water, thus allowing the free halogen species to hydrolyze to HCl and HF. These acid species are then neutralized with an alkaline earth metal such as calcium hydroxide to form a mixed brine slurry containing alkaline earth metal chloride fluoride salts (e.g., $CaCl_2$ and $CaF_2$) in a ratio dependent on the feed CFC mixture. The carbon present in the reactor is converted to carbon dioxide and recovered for reuse by converting to a alkaline earth metal carbonate raw material in the glass making process.

In Stage Two of the process, the mixed brine slurry of halogenated salts, along with the recovered carbon dioxide, is then combined with other glass-forming raw materials in a vitrification device. There are several types of appropriate raw materials that can be used either alone or in combination. The raw materials typically utilized are silica sand with a minimum purity of 99% silicon dioxide, which when heated in the presence of the carbon dioxide from Stage One yields sodium carbonate, to yield sodium oxide at between 20–120 mesh size. Also, other raw materials can be used such as dolimitic limestone, which when reacted with carbon dioxide yields calcium oxide with some quantity of magnesium oxide as natural contaminate at between 20–120 mesh size. Also used is feldspar, which when heated with carbon dioxide yields aluminum oxide, silica dioxide, sodium oxide and potassium oxide.

Individual batches of brine slurry from Stage One are heated in the vitrification device to between about 2800° F. and 3200° F. which begins the formation of a viscous glass product. This glass product is then cooled through a series of stages and pressed into a final glass frit product. The product can be used for a raw material replacement for glass manufacturing.

Figure 2:
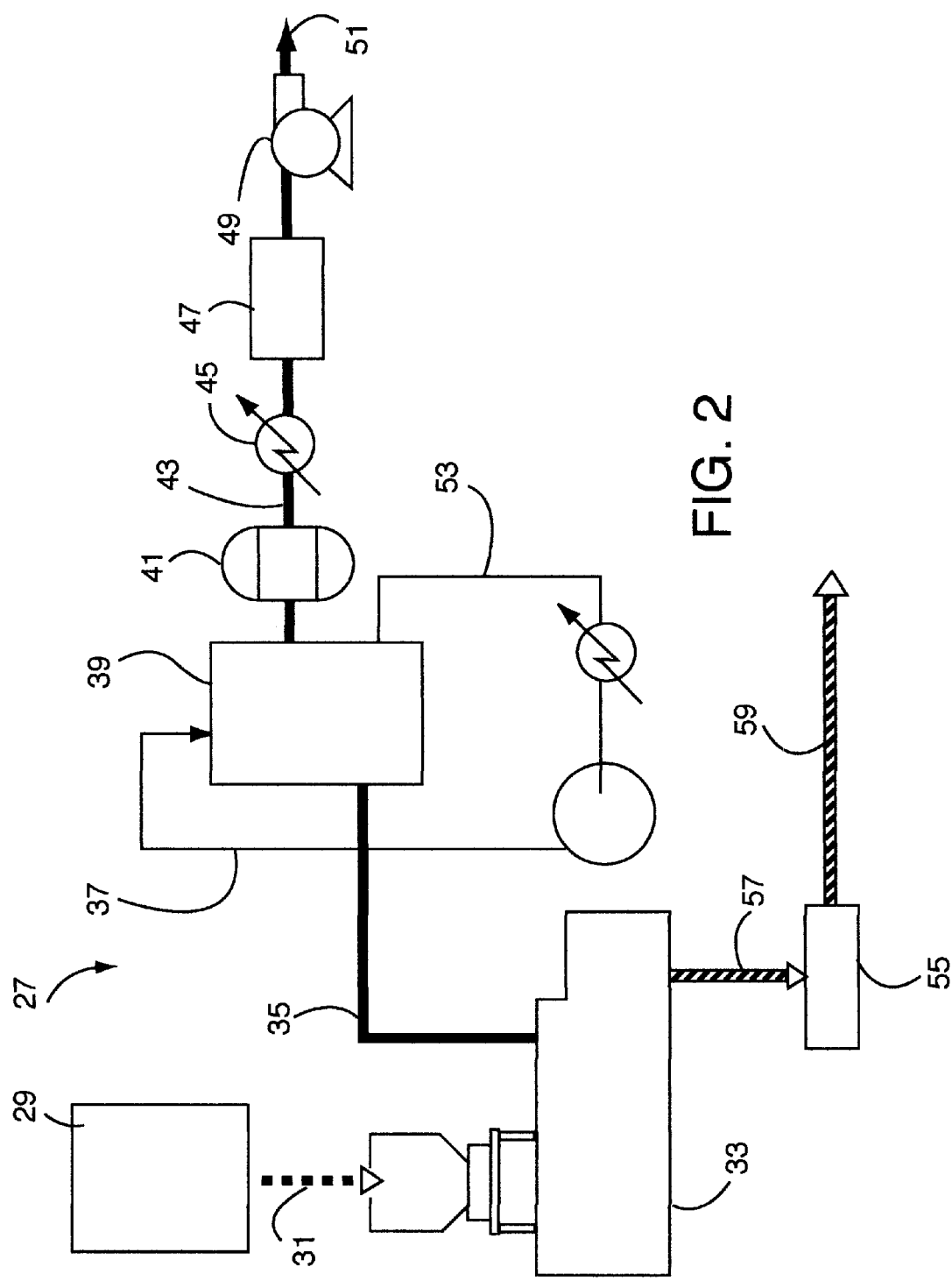
FIG. 2 is a flow diagram of the Stage Two vitrification device of the invention.

The method of the present invention is described further with reference to FIGS. 1 and 2. Although the method of the invention is described with reference to these figures, it is to be understood that the structure of the incineration and vitrification units is variable, the figures only intending to be representative of the invention. In general, FIG. 1 describes the Stage One process in the method of the invention, wherein the CFCs and HCFCs are thermally separated to form a brine slurry. Specifically, with reference to FIG. 1, thermal separator 11 includes feeder 13 wherein the liquid and gaseous CFCs and HCFCs are first added. The feeder delivers the CFCs and HCFCs to an initial chamber 23 wherein they are heated by a plasma torch 15. The plasma torch heats the hydrocarbons to between 2800° F. and 3200° F., wherein the halocarbon-plasma enters a secondary combustion chamber 17. In the halocarbon-plasma, the chlorine and fluorine undergoes heterolytic and homolytic cleavage from the parent hydrocarbon, and is thus free to react with other species within the plasma. Typically, water in the chamber reacts with the free chlorine and fluorine to produce HCl and HF, which is then neutralized within chamber 17 with a metal oxide, preferably calcium oxide, to form a brine slurry of calcium chloride and calcium fluoride salts.

The salts formed in Stage One are then typically contained in slag chamber 19. Any gases such as carbon dioxide which are removed from the secondary combustion chamber 17 and the slag chamber 19 are removed and treated through gas treatment apparatus 21, wherein the gases are then sent to an exhaust stack 25 or recycled into the Stage Two device.

The vitrification unit 27 of the present invention is described with reference to FIG. 2, wherein Stage Two is carried out. The slurry resulting from Stage One and the removed carbon dioxide is introduced into the melter feed storage 29. Melter feed 31 is therein delivered to a Joule-heated ceramic melter 33. It is in the ceramic melter 33 that the brine is then combined with other glass-forming materials such as sand and feldspar. The ceramic melter 33 heats the mixture to between about 2800° F. and 3200° F., wherein a viscous glass product is formed and is delivered via path 57 to the glass quencher 55 and then onto a final product 59. Off gas such as carbon dioxide is drawn off through line 35 to a quench scrubber 39, wherein the gas is then passed through a roughing filter 41 and through a heat exchanger 45 through line 43. Finally, the gas is passed through a HEPA filter 47 and then blown through blower 49 to stack 51. A scrub solution is delivered through line 37 to the quench scrubber 39, wherein it is recirculated through line 53 through a heat exchanger and then back to the quench scrubber 39.

The present invention offers several advantages over the prior art. The present invention effectively removes the environmental danger of CFCs and HCFCs as an ozone-depleting contaminant by immobilizing them into a halide glass product.

Another advantage to the present invention is that the glass thus produced by the invention can be further processed and used commercially for halide glass manufacturing.

While the invention has been shown in only one of its forms, it is not thus limited but is susceptible to various changes and modifications without departing from the spirit thereof.

What is claimed is:

1. A method of converting a halogenated compound into a halide glass, the method comprising:
   incinerating a halogenated compound to separate the halogen from the carbon in the presence of water;
   allowing the free halogen species to hydrolyze with the water to form an acid species;
   neutralizing the acid species with an alkaline earth metal to form a slurry of halogenated salts;
   removing any gas produced;
   mixing the slurry of halogenated salts with a glass forming raw material;
   heating the halogenated salt slurry and the glass forming raw material to form a viscous glass product; and
   cooling the viscous glass product so as to form the halide glass.

2. The method of claim 1 wherein the halogenated compound is a compound selected from the group consisting of R-11 Trichlorofluoromethane, R-12 Dichlorodifluoromethane, R-13 Chlorodifluoromethane, R-22 Chlorodifluoromethane, R-113 Trichlorotrifluoroethane, R-114 Dichlorotetrafluoroethane, R-115 Chloropentafluoroethane, R-123 Dichlorotrifluoroethane, R-124 Chlorotetrafluoroethane, R-125 Pentafluoroethane, R-134a Tetrafluoroethane, R-141b Dichlorofluoroethane, R-142b Chlorodifluoroethane, R-143a Trifluoroethane, R-12 Dichlorodifluoromethane, R-500 Difluoroethane, R-502 Chlordifluoromethane/Chloropentafluorethane, R-14 Terafluoromethane, R-23 Trifluoromethane, R-116 Hexafluoroethane, R-142b Chlorodifluoroethane, R-152a Difluoroethane, R-12B Bromochlorodifluoromethane, R-13B Bromotrifluoromethane, R-1120 Chlorodifluoroethane, R-110 Chloroethane, R-40 Chloromethane, R-1130 Dichloroethylene, R-32 Dichloromethane, R-40 Chloromethane, R-30 Methylene chloride, and R-10 Carbontetrachloride.

3. The method of claim 1 wherein an argon plasma system is used to incinerate the halogenated compound.

4. The method of claim 3 wherein the operating temperature of the argon plasma system is in excess of 3,000° F.

5. The method of claim 1 wherein the removed gas contains carbon dioxide.

6. The method of claim 5 wherein the alkaline earth metal is calcium hydroxide.

7. The method of claim 6 further comprising heating the calcium hydroxide in the presence of the recovered carbon dioxide to produce sodium carbonate.

8. The method of claim 5 wherein the alkaline earth metal is dolimitic limestone.

9. The method of claim 8 further comprising heating the dolimitic limestone in the presence of the recovered carbon dioxide to produce calcium oxide.

10. The method of claim 5 wherein the alkaline earth metal is feldspar.

11. The method of claim 10 further comprising heating the feldspar in the presence of the recovered carbon dioxide to produce aluminum oxide, silica dioxide, sodium oxide, and potassium oxide.

12. The method of claim 1 wherein the glass forming raw material is silica sand.

13. The method of claim 12 wherein the silica sand has a minimum purity of 99% silicon dioxide.

14. The method of claim 1 wherein the temperature at which the halogenated salt slurry and the glass forming raw material is heated is between about 2,800° F. and 3,200° F.

15. The method of claim 1 wherein the glass formed is a glass frit product to be used as a raw material replacement for glass manufacturing.

16. A method of converting a halogenated compound into a halide glass, the method comprising:
   adding halogenated compounds to a thermal separator through a feeder;
   incinerating the halogenated compounds in the thermal separator to produce a halocarbon-plasma wherein the halogen compound undergoes heterolytic and homolytic cleavage from a parent hydrocarbon;
   moving the halocarbon-plasma into a secondary combustion chamber wherein the cleaved halogen compound reacts with water in the chamber to form an acid species;
   neutralizing the acid species with an alkaline earth metal to form a slurry of halogenated salts in a slag chamber;
   removing any gas from the slag chamber;
   sending at least a part of the removed gas into a melter feed storage;
   sending the slurry of halogenated salts into the melter feed storage;
   combining the slurry of halogenated salts with glass forming materials in the melter feed storage;
   heating the mixture of the slurry of halogenated salts with glass forming materials to produce a viscous glass product;
   delivering the viscous glass product to a glass quencher wherein the viscous glass product can be cooled so as to produce the halide glass.

17. The method of claim 16 wherein the halogenated compound is a compound selected from the group consisting of R-11 Trichlorofluoromethane, R-12 Dichlorodifluoromethane, R-13 Chlorodifluoromethane, R-22 Chlorodifluoromethane, R-113 Trichlorotrifluoroethane, R-114 Dichlorotetrafluoroethane, R-115 Chloropentafluoroethane, R-123 Dichlorotrifluoroethane, R-124 Chlorotetrafluoroethane, R-125 Pentafluoroethane, R-134a Tetrafluoroethane, R-141b Dichlorofluoroethane, R-142b Chlorodifluoroethane, R-143a Trifluoroethane, R-12 Dichlorodifluoromethane, R-500 Difluoroethane, R-502 Chlordifluoromethane/Chloropentafluorethane, R-14 Terafluoromethane, R-23 Trifluoromethane, R-116 Hexafluoroethane, R-142b Chlorodifluoroethane, R-152a Difluoroethane, R-12B Bromochlorodifluoromethane, R-13B Bromotrifluoromethane, R-142b Chlorodifluoroethane, R-110 Chloroethane, R-40 Chloromethane, R-1130 Dichloroethylene, R-32 Dichloromethane, R-40 Chloromethane, R-30 Methylene chloride, and R-10 Carbontetrachloride.

18. The method of claim 16 wherein the excess gas is scrubbed then released through a stack.

19. The method of claim 16 wherein a ceramic melter heats the halogenated salt slurry and the glass forming raw material to a temperature between about 2,8000° F. and 3,200° F.

20. The method of claim 16 wherein the glass produces is used commercially for halide glass manufacturing.

* * * * *